United States Patent [19]
Ross

[11] 3,971,990
[45] July 27, 1976

[54] BASE-BAND PULSE OBJECT SENSOR SYSTEM
[75] Inventor: Gerald F. Ross, Lexington, Mass.
[73] Assignee: Sperry Rand Corporation, New York, N.Y.
[22] Filed: Feb. 26, 1975
[21] Appl. No.: 553,345

Related U.S. Application Data
[62] Division of Ser. No. 377,853, July 9, 1973, which is a division of Ser. No. 134,990, April 19, 1971, Pat. No. 3,772,697.

[52] U.S. Cl. .............................................. 325/400
[51] Int. Cl.² ........................................ H04B 1/16
[58] Field of Search ........... 325/401, 397, 400, 404, 325/407, 410, 411; 343/5 SM, 5 R, 5 PD, 13 R, 17.1 R; 333/6, 9, 17 R; 328/151

[56] References Cited
UNITED STATES PATENTS
3,241,076  3/1966  Magleby et al. ................... 328/151
3,550,008  12/1970  Bright ............................. 325/364 X
3,760,283  9/1973  Lockwood ......................... 328/151

Primary Examiner—Benedict V. Safourek
Assistant Examiner—Robert Hearn
Attorney, Agent, or Firm—Howard P. Terry

[57] ABSTRACT

A pulse transmitter-receiver system for detecting the presence and proximity of objects employs transmission of short base-band or subnanosecond electromagnetic signals and reception thereof by a dispersionless, broad band transmission line antenna system with a receiver circuit cooperating with a biased semiconductor diode located within the transmission line antenna system for instantaneously detecting substantially the total energy of each reflected base-band pulse and for providing corresponding outputs suitable for indication of the presence or of the range of such proximate objects.

3 Claims, 19 Drawing Figures

BASE-BAND PULSE OBJECT SENSOR SYSTEM

CROSS REFERENCE TO RELATED APPLICATION

This is a division of patent application Ser. No. 377,853, filed July 9, 1973, and entitled: "Base Band Pulse Object Sensor System" in the name of Gerald F. Ross which, in turn, is a division of patent application Ser. No. 134,990, filed Apr. 19, 1971, and entitled: "Base Band Pulse Object Sensor System," in the name of Gerald F. Ross, issued Nov. 13, 1973 as U.S. Pat. No. 3,772,697.

BACKGROUND OF THE INVENTION

1. Field of the Invention

The invention pertains to the transmission and reception of base-band or subnanosecond signals relative to reflecting objects and more particularly pertans to means for utilizing object-reflected signals for generation of signals according to the presence of such reflecting objects and also to means for utilizing the reflected signals for generating signals according to the ranges of such reflecting objects.

2. Description of the Prior Art

In prior art object detection and ranging systems, it is common practice to irradiate a distant object with pulses of electromagnetic energy containing many high frequency cycles, and to determine the presence of such an object and its distance from the object detection system as a function of the time interval between the envelopes of corresponding transmitted and received pulses. Although the transmitted pulses are relatively short, they are highly energetic and means must be provided fully to block the receiver for an appreciable time such as, for instance, for one microsecond, precluding the reception of echo pulses until after the transmitted pulse has decayed. In the case of an object detection system employing one microsecond duration transmitted pulses, the receiver is fully blocked for slightly ever one microsecond, rendering the receiver insensitive to objects closer than, say, several hundred feet. Because such prior art transmitters use high level pulse transmission, they also have the undesired feature of rendering a considerable portion of the high frequency spectrum useless for communication and other desirable purposes.

Furthermore, conventional object detector transmitter and reception are notoriously complex and inefficient and are sensitive to many failure possibilities. In the receiver, complex frequency control and conversion arrangements are required as well as intricately designed and expensive receiver gain elements, each of band widths sufficient to process the reflected pulse signals. There is not known in the prior art a radio frequency object detector system which may be successfully operated over substantial object distances in a wave band already allotted to conventional receivers in the same geographical vicinity. More particularly, there is not known in the prior art a radio frequency object detector system of the just described type which can operate at very low or legal power levels in such wave bands without it itself being the victim of intolerable interference. Furthermore, there is not known in the prior art a radio frequency object detector system such as described in the foregoing and also capable of transmission and reception of signals having an extremely wide frequency spectrum without interfering with the transmission of ordinary radio communication signals.

SUMMARY OF THE INVENTION

The invention pertains to radio pulse object detection systems of a novel kind so constructed and arranged as to afford sensing of near-by objects without interference with conventional types of radio communication systems, and, in turn, being substatially unaffected in normal operation by the radiations of other radio frequency systems or by ambient electrical noise signals.

The transmitter appropriate for employment in the novel object detection system utilizes a non-dispersive transmission line system for generation of base-band or subnanosecond pulses of electromagnetic energy and for their radiation into space, cyclic energy storage on the transmission line and alternate cyclic energy radiation therefrom being employed. The transmission line functions as a non-dispersive radiator, launching the subnanosecond impulses into space with substantially no distortion. Such base-band pulses have an extremely wide energy spectrum; while the total energy content of any given transmitted base-band pulse may be considerable, the few spectral lines falling within the relatively narrow pass band of a conventional receiver are of low amplitude and have no effect thereon.

The object detector receiver suitable for detecting and utilizing such short base-band electromagnetic pulses also employs a dispersionless transmission line antenna, with a utilization circuit cooperating with a biased semiconductor detector element located within the antenna transmission line for instantaneously detecting substantially the total energy of the base-band pulse and for supplying a corresponding output suitable for application in presence or range indicating circuits. The receiver antenna system supplies substantially the total energy of each undistorted received base-band pulse directly to the receiver detector; thus, the receiver is adapted to operate successfully with pulse signals having a very wide spectral extent. Further, the receiver may operate with base-band pulse signals having spectral components each of such low individual energy content as to escape detection by conventional relatively narrow band receivers. The total energy in each base-band pulse can, however, be relatively larger than the level of noise or other interfering pulses or signals in the vicinity of the novel receiver in a given time interval. Thus, by appropriately adjusting the output level of the object detector transmitter and the sensitivity or threshold of the object detector receiver, base-band signals not affecting other receivers are readily transmitted, received and detected without the object detector receiver, in turn, being affected in any substantial degree by other radio energy transmissions.

The major processing of the echo signals is accomplished, according to the invention, by simple base-band signal processing circuits, thus avoiding the need for signal frequency conversion and the problems associated with alignment and operation of conventional radio and intermediate frequency amplifiers. For example, gain control means analogous to sensitivity time control commonly employed in conventional radar systems is accomplished without conventional duplexing directly upon the base-band echo pulses, as is the signal processing required for generation of presence and range signals.

The novel base-band object detector system operates with very low energy consumption, so that power supply cost and size are minimized. Furthermore, with such low power operation, inexpensive components find long life was throughout the transmitter. The receiver and signal processor circuits are similarly categorized, both elements being of very simple nature and otherwise inexpensive of installation, maintenance, and operation, adapting readily to cooperative use with conventional processing and control equipment.

DESCRIPTION OF THE PREFERRED EMBODIMENTS

Figure 1:
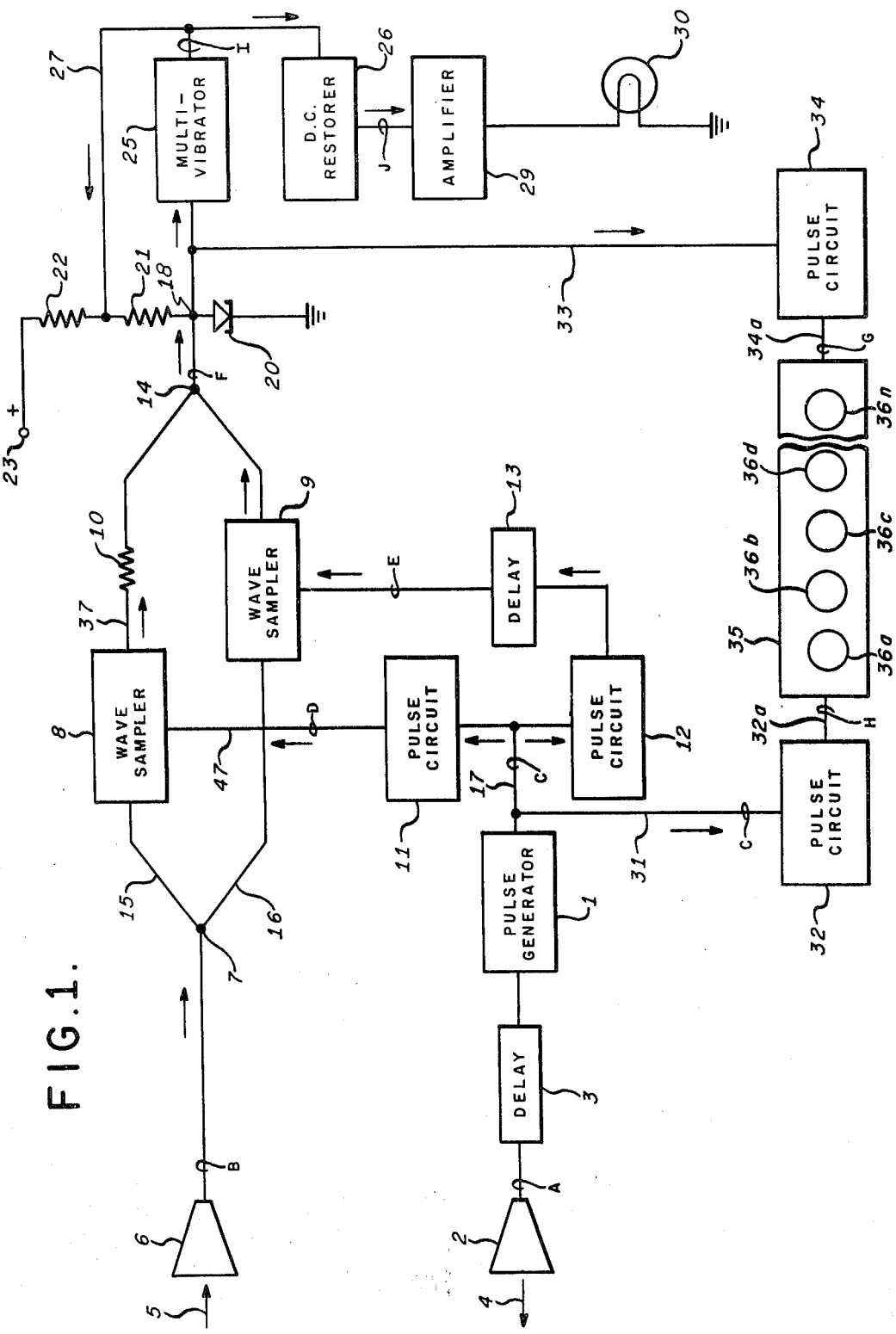
FIG. 1 is a diagram of a preferred embodiment of the invention showing components thereof and their electrical interconnections.

The embodiment of the invention represented in FIG. 1 utilizes a short base-band transmitter or pulse generator 1 and a directive radiator antenna 2, the transmitter pulse generator 1 being connected to radiator or antenna 2 through a delay 3 which may be inherent in the interconnecting transmission line system or which may be deliberately introduced therein. Generator 1 may be of the self-synchronizing kind and may be of a generally conventional type. For example, there is known in the art a variety of transmitter systems for producing single positive or negative going pulses or regular or other trains of pulses each pulse having very short duration and for radiating such pulses from a suitable antenna 2. Rotary and other spark gap transmitters, for instance, though somewhat inefficient, readily produce short electromagnetic pulses. Delay line pulse generators are well understood in the art to be capable of adjustment such that very short electromagnetic pulses may be radiated. One device for producing such short base-band pulses is disclosed by G. F. Ross in the U.S. Pat. No. 3,403,370 for a "Pulse Generator," issued Nov. 30, 1965.

Figure 2A:
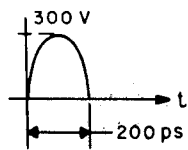
FIGS. 2A to 2J are graphs of wave forms useful in explaining the operation of the embodiment of FIG. 1.

While prior art transmitters are not normally used to produce truly short base-band or subnanosecond pulses, mere adjustment of parametric relations may permit such a result substantially to be obtained. Further, the performance of such transmitters in efficiently launching actual base-band pulses into space may be greatly improved by the use of the general kind of radiating antenna system employed by G. F. Ross and D. Lamensdorf in the U.S. patent application Ser. No. 46,079, for a "Balanced Radiation System", filed June 15, 1970, issued Apr. 25, 1972 as U.S. Pat. No. 3,659,203 and assigned to the Sperry Rand Corporation. The latter device, for instance, employs an electrically smooth, constant impedance, transmission line system for propagating TEM mode electromagnetic waves. The transmission line system is employed for the cooperative cyclic storage of energy on the transmission line and for its cyclic release by propagation along the transmission line and radiation at the end of a section of the transmission line formed as a directive antenna. Thus cooperative use is made of the transmission line system for signal generation by charging the transmission lines at a first rate of charging and also for signal radiation into space by discharging the line in a time much shorter than required for charging. Discharge of the transmission line causes a voltage wave to travel toward the radiating aperture of the antenna structure. The process operates to produce, by differentiation caused by the radiating aperture, a sharp base-band impulse A of a subnanosecond duration as seen in FIG. 2A that is radiated into space. The antenna system has a wide instantaneous band width, so that it may radiate such very sharp impulse-like signals as indicated by arrow 4 in FIG. 1 with low distortion. Further, antenna 2 has an energy focusing characteristic such that energy radiated in a predetermined direction is maximized, as is desirable in object detection systems.

Figure 2B:
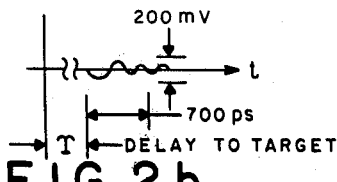

The radiated base-band signal A propagates in free space toward a reflecting target and is reflected by the target surface to return toward receiver antenna 6 as wave B and as indicated by arrow 5. Wave B may have been modified, in the usual manner according to the particular nature of the reflecting target, so that it has the somewhat time extended appearance shown in FIG. 2B. Wave B is delayed with respect to wave A by a time Y which is proportional to twice the distance or range to the reflecting target.

Any echo signal energy collected by receiver antenna 6 is next directly subjected to the operation of a base-band automatic gain or sensitivity time control system comprising base-band wave samplers 8 and 9, respectively controlled by the outputs of base-band pulse circuits 11 and 12, which latter are, in turn, controlled for synchronized operation by transmitter pulse generator 1. For example, certain echo signals collected by atenna 6 pass through junction 7 into branch transmission line 15, through wave sampler 3 and then through resistor or transmission line attenuator 10 to junction 14. Certain other echo signals are permitted to pass through junction 7, branch 16, and wave sampler 9 directly to junction 14 for further processing by the base-band receiver system. Wave sampler 8 is caused to conduct echo signals for a predetermined time by a direct output from pulse circuit 11 when triggered by the output of generator 1. On the other hand, wave sampler 9 is caused to conduct echo signals for a predetermined time by an output of pulse circuit 12 delayed by delay 13 with respect to the output of generator 1. Pulse circuit 12, like pulse circuit 11, is also triggered by the transmitter pulse generator 1. Pulse circuits 11 and 12 may be selected from the class of known avalanche or other diode circuits which may be actuated by an input short duration signal of amplitude of the order of a few millivolts to produce an output of increased magnitude which also has an increased duration, the duration being determined by the length of a properly terminated charged transmission line cooperating in the pulse circuit in a conventional manner.

As noted above, wave samplers 6 and 9 are adapted to permit samples of the incoming echo signals to pass to junction 14. The individual structure and operation of wave samplers 8 and 9 will be discussed later in detail with reference to FIGS. 3 to 8; these elements are the separate subject matter of the G. F. Ross U.S. patent application Ser. No. 134,991 for a "Short Time Electromagnetic Wave Signal Sampling System," filed Apr. 19, 1971 and assigned to the Sperry Rand Corporation, issued as U.S. Pat. No. 3,721,912 on Mar. 20, 1973.

Figure 2C:
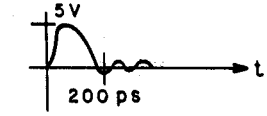
Figure 2D:
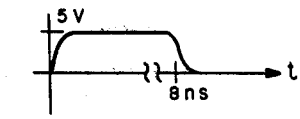

In operation, the sensitivity time control system associated with wave samplers 8 and 9 permits attenuation of received echoes from close range targets and particularly of spill-over energy directy flowing from transmitter antenna 2 to receiver antenna 6. For this purpose, wave C of FIG. 2C is derived by coupling energy from the transmission line system of pulse generator 1 to transmission line 17, whereupon the base-band wave C is applied to avalanche diode pulse circuit 11, causing it to swing heavily into conduction and producing the amplified or somewhat extended extending wave D of FIG. 2D. Wave D, being coupled to an input of wave sampler 8, causes it so conduct short range echoes from junction 7 to junction 14, while predetermined attenuation of wave D occurs because of the presence of attenuator 10.

Figure 2E:
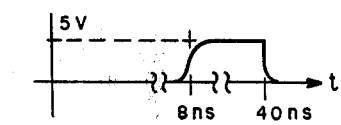
Figure 2F:
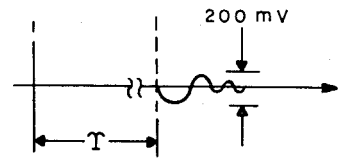

Wave C is supplied via transmission line 17 to the second avalanche diode pulse circuit 12, similarly causing it to conduct and to produce wave E of FIG. 2E after subjection to the influence of delay device 13. As is seen upon comparing the time relation of waves D and E, wave E begins substantially at the time that wave D ends. Accordingly, wave E is used to operate wave sampler 9 so that later arriving echoes from more remote targets are transmitted directly without attenuation to junction 14. FIG. 2F represents the general appearance of a representative echo F upon arrival at junction 14 having been delayed with respect to wave A by the time Y according to the range of the reflecting object.

It will be understood that the transmission lines interconnecting the elements thus far presented are selected for their ability to propagate base-band signals with substantially no dispersion. While dual parallel conductor lines or coaxial transmission lines are preferably employed, any selected energy transmission medium should be devoid of impedance discontinuities and so constructed and arranged as to support TEM mode propagation of the high frequency energy, since it is the TEM transmission line mode that is the substantially non-dispersive mode.

With the preferred transmission medium, any subnanosecond pulse collected by receiver antenna 6 is passed with substantially no degradation within transmission lines 15 and 16 to junction 18 and thence to the active diode element 20, which is preferably a tunnel diode or other high speed diode adapted to serve as an impulse detector. A suitable diode 20 has a negative resistance current-voltage characteristic such that, under proper bias, the diode response to the arrival of pulse signals collected by antenna 6 and supplied to junction 14 is to change to its conductive state. For this purpose, diode 20 is coupled to ground and through series resistors 21 and 22 to a suitable source of bias voltage (not shown) at terminal 23. Diode 20 has a characteristic such that, under such proper bias, the diode response to the arrival of impulse or base-band signals from junction 14 is to move abruptly into its region of instability, causing it to become highly conductive.

In this manner, a current pulse which may be of somewhat greater amplitude and of considerably longer duration than the base-band signal is generated by tunnel diode 20 and is coupled to the input of one shot multivibrator circuit 25. The longer duration, higher energy signal is required for reliable triggering of one shot miltivibrator 25. The output pulse of multivibrator 25 is the rectangular pulse I of FIG. 2I having a 100 nanosecond duration, for example, which is passed to d.c. restorer 26. The 100 nanosecond pulse is also coupled by lead 27 to the junction 28 between bias control resistors 21 and 22. At junction 28, the trailing edge of the 100 nanosecond pulse has the effect of resetting diode 20 and of stopping conduction therethrough. Thus, tunnel diode 20 is reset to its original low conduction state and is prepared to receve the next arriving echo pulse from receiver antenna 6 which exceeds the triggering level of diode 20. In place of the circuit shown herein in association with diode 20, there may be used other circuits capable of producing a relatively long duration pulse when triggered into conduction by a base-band or very short duration pulse. For example, suitable circuits are disclosed by Kenneth W. Robbins in the U.S. patent application Ser. No. 123,720 entitled: "Short Base-Band Pulse Receiver," filed Mar. 12, 1971, issued May 9, 1972 as U.S. Pat. No. 3,662,316 and in the G. F. Ross U.S. patent application Ser. No. 123,533 for a "Short Base-Band Pulse Communication System", filed Mar. 12, 1971, issued as U.S. Pat. No. 3,728,632 on Apr. 17, 1973 both applications being assigned to the Sperry Rand Corporation.

As noted, the wave I output from one shot multivibrator 25 is coupled to a conventional d.c. restorer circuit 26. After amplification, if required, by a suitable d.c. amplifier 29, the d.c. restorer output signal J of FIG. 2J may be coupled to any suitable utilization device 30. In FIG. 1, utilization device 30 is illustrated as being an incandescent lamp 30 which may serve as a target presence or alarm indicator for informing the observer of the presence of a target within the operating range span of the system. It will be clear to those skilled in the art that other utilization devices may be used along with or in lieu of lamp 30. With the gain control attenuator 10 properly adjusted, as well as the bias level applied at terminal 23 and thus to diode 20, direct spill-over energy from antenna 2 to receiver antenna 6 does not actuate alarm lamp 30, and only true echo signals passing wave sampler 8 or wave sampler 9 cause lamp 30 to operate. It is seen that early echoes are attenuated because direct transmitter spill over or leakage would otherwise trigger diode 20. However, close targets inherently reflect higher levels of energy into receiver antenna 6 than the level of spill over, so that close targets are detected as readily as targets of greater range.

It is seen that the embodiment of the invention described above for indicating the presence of a reflecting object employs subnanosecond or base-band energy transmission line elements for receiving and detecting very short duration energy pulses, and for supplying an output adapted for operating what may be conventional utilization equipment, such as an alarm device of known kind. The transmitter-receiver system employs substantially dispersionless, very wide band transmission line and antenna elements cooperating directly with a biased pulse detector diode 20 located within the transmission line for detecting the total energy of the undistorted base-band echo pulses. A cooperating circuit coupled to the detector diode supplies a corresponding output signal suitable for application in utilization circuits and recycles the receiver-detector system to make it ready for the receipt of a succeeding short base-band echo pulse. Since the total energy of the base-band pulse is instantaneously supplied by the dispersionless transmission line system across the semiconductor receiver detector diode 20, the receiver may operate with base-band pulse signals having spectral components the amplitudes of which are all incapable of detection by conventional relatively narrow band receivers. Processing of the base-band echo signal is accomplished without frequency conversion and only simple and reliable low-power-consumption components are employed. The response of the system to far and near targets and to spill-over signals is ingeneously controlled at the base-band level by operation of a simple gating and attenuation apparatus.

A key element of the base-band gain control system is represented by the identical wave samplers 8 and 9, now to be discussed in further detail with reference to FIGS. 3, 4, and 6, where transmission lines 15 and 37, for example, correspond to the input and output transmission lines 15 and 37 of wave sampler 8 of FIG. 1. Actual sampling of the echo signal is accomplished by sampling network 43 of FIG. 3, to be discussed in further detail in connection with FIG. 4, and to which balanced, simultaneous inputs in the form of sampling control signals are supplied via transmission lines 44 and 45. These sampling control signals, designated by the symbols $+p(t)$ and $-p(t)$ in FIG. 3, originate in wave forming network 46, further to be discussed in relation to FIG. 6, and are designed to have substantially equal and opposite amplitudes when they arrive simultaneously at the control point of the sampling network 43. Signals $+p(t)$ and $-p(t)$ may be generated by wave forming network 46 from an input signal of the same form as signal $+p(t)$ propagating within input transmission line 47 and supplied by pulse generator 1 of FIG. 1.

The $+p(t)$ signal appearing on input transmission line 47 is, for instance, a positive going base-band or nanosecond duration electromagnetic energy pulse. Such signals are readily produced by a conventional transmitter pulse generator 1 of the kind having a delay line configuration adjustable in such a way as to produce short duration electromagnetic pulses. Device for producing such short base-band pulses are disclosed by G. F. Ross in the aforementioned U.S. Pat. No. 3,402,370. The $+p(t)$ signal may be derived in a conventional way by coupling energy from a base-band pulse propagating element of a transmitter of the integrated type disclosed by G. F. Ross et al in the above-mentioned U.S. patent application Ser. No. 46,079 for a "Balanced Radiation System," issued Apr. 25, 1972 as U.S. Pat. No. 3,659,203 or in the U.S. patent application Ser. No. 123,533 for a "Short Base-Band Pulse Communication System." Other disclosures appear in the prior art of magnetically controlled mercury reed switch systems designed to initiate formation of subnanosecond impulses in charged wave propagation systems.

Figure 3:
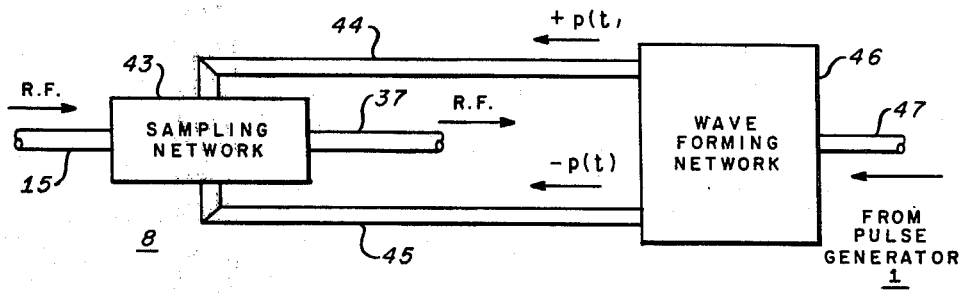
FIG. 3 is a block diagram of the wave samplers of FIG. 1.
Figure 4:
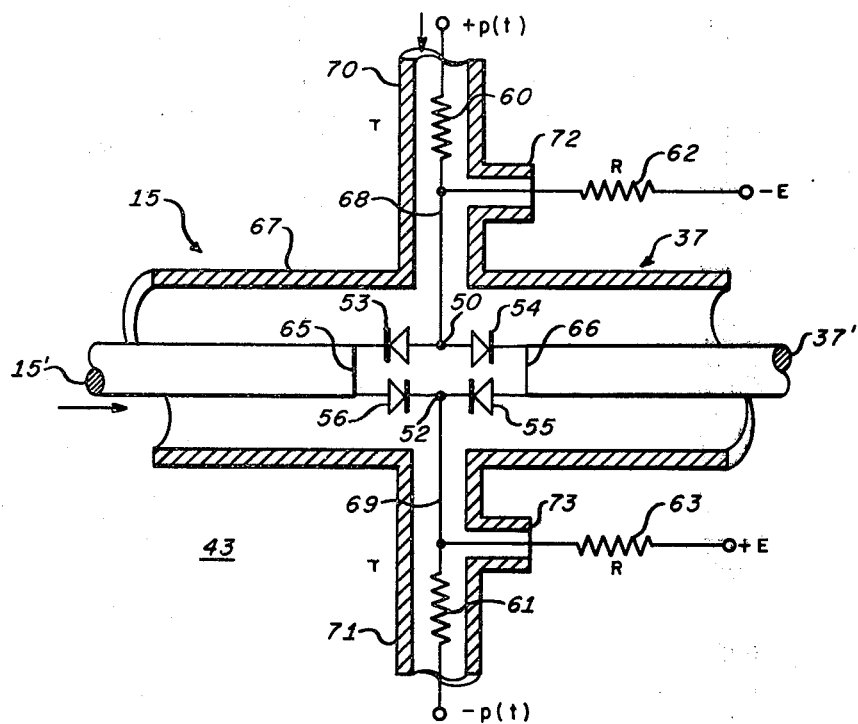
FIG. 4 is a cross section view of the sampling network component of FIG. 3.
Figure 5:
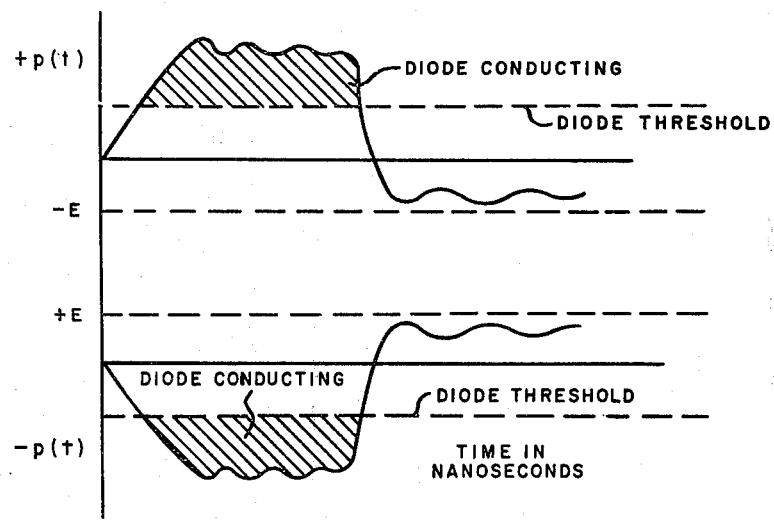
FIG. 5 is a graph of wave forms useful is explaining the operation of the apparatus of FIG. 4.

The basic circuit of the sampling network 43 takes the for of the balanced bridge circuit shown in FIG. 4 where, for convenience, the transmission lines 15 and 37 of FIG. 3 are represented by the respective inner and outer conductors 15, 15', 37 and 37'. Conductors 15' and 37' lie in the plane of zero sampling potential of the network. Sampling network 43 further comprises a four-armed bridge with arms coupling junctions 50 and 52 with respective diodes 53, 54, 55, 56, the diodes being poled as indicated in the figure. The intermediate junctions 50 and 52 are respectively supplied with sampling control signals via transmission lines 68 and 69. For example, the short duration or nanosecond signal $+p(t)$ is supplied by line 68 via matching resistor 60 to junction 50; likewise, the short-duration nanosecond signal $-p(t)$ is coupled by line 69 through the similar resistor 61 to junction 52. Resistors 60 and 61 may have a resistance value $r$, for example, of about 250 ohms. Junction 50 is supplied with a unidirectional bias voltage $-E$ via bias regulating resistor 62, while junction 52 is supplied with an equal but oppositely poled voltage $+E$ via similar regulating resistor 63. The resistance R of bias regulating resistors 62 and 63 will depend upon the characteristics of the selected diodes 53 to 56.

Diodes 53 to 56 are preferably of the type known as fast-switching barrier or hot carrier semiconductor diodes particularly suited to very high frequency applications where low noise properties, uniformity, and reliability are desired. The voltages $+E$ and $-E$ normally bias the fast acting diodes in their non-conducting states. As in FIG. 5, the application of voltages $+p(t)$ and $-p(t)$ of similar shape, magnitude, and time durations to the sampling network 43, whereby the respective bias levels of the diodes are exceeded, causes the diodes simultaneously to conduct. Such an event permits the high frequency input signal on input transmission line 15 to flow out through output transmission line 37. The duration of the sampled outflow is substantially the same as the duration of current flow through the diodes 53 to 56. None of the sampling signal $+p(t)$ or $-p(t)$ appears at the output port of line 37. The value of resistor $r$ may be varied somewhat, though if $r$ is larger than the relatively non-critical optimum value, the magnitudes of pulses $+p(t)$ and $-p(t)$ must be increased. For relatively smaller values of resistance $r$, the base-band pulse generator 1 feeding transmission line 47 may undesirably load transmission line 15, 37.

The short-duration or nanosecond sampling network 43 may be arranged in coaxial transmission line as shown in FIG. 4 or other types of transmission line may be employed. It is seen that the connection of diodes 53 and 54 to the respective ends 65 and 66 of conductors 15' and 37' is along a first straight line path at points on the peripheries of conductors 15', 37'. Likewise, the connections of diodes 55 and 56 to the respective ends 65 and 66 of inner conductors 15', 37' is along a second straight line path at points on the peripheries of conductors 15'. 37' spaced 180 angular degress from the first path. It is seen that the inner conductor ends 65 and 66 now respectively act as a pair of opposed junctions of the bridge circuit, of which junctions 50 and 52 form the other pair of opposed junctions.

In FIG. 4, the purpose of the outer conductor of transmission lines 15, 37 is served in common by hollow conductor 67. Conductor 67 has opposed openings through which transmission line leads 68 and 69, respectively branching perpendicularly from junctions 50 and 52, are respectively accommodated. The lead 68 from junction 50 couples to resistor 60 and thus to the source of the $+p(t)$ signal. Likewise, the lead 69 from junction 52 couples to resistor 61 and thus to the source of the $-p(t)$ signal. Lead 68 and resistor 60 lie within a first relatively small branching outer conductor 70. Likewise, lead 69 and resistor 61 lie within an oppositely disposed second relatively small branching outer conductor 71. Openings 72 and 73 in the respective outer conductors 70 and 71 permit connection of bias regulating resistors 62 and 63 to the respective leads 68 and 69, thereby assuring correct application of the respective bias voltages $-E$ and $+E$. It will be understood that the proportions used in the drawing of FIG. 4 are chosen for the purpose of providing clarity in the drawing, and do not necessarily represent proportions which would be used in actual practice.

In the operation of the sampling network of FIG. 4, diodes 53 to 56 are selected for permitting proper balance of the circuit. Commercially available diodes of the type suitable for use as diodes 53 to 56 are not generally completely ideal, since they exhibit slight variations in capacitive characteristics in the non-conducting state, and therefore selection of matched diodes is preferred. While two cooperating conducting paths with pairs of diodes, as diodes 53 and 54 and diodes 55 and 56 of FIG. 4, may be employed, it may be preferred to use additional diodes in additional conducting paths between the peripheries of conductors 15', 37'; for example, a total of eight diodes may comprise the bridge network. Use of more than two conducting paths aids in maintaining substantially smooth impedance characteristics in the region between the conductors 15' and 37', thus reducing reflected energy and dispersion of the signals propagating from conductor 15' to conductor 37'. Substantially all energy is propagated in the coaxial transmission line system 15, 37, 15', 37' of FIG. 4 in the TEM mode, the preferred mode since it is the substantially dispersionless propagation mode.

Turning now to the wave forming network 46 of FIG. 3 for activating sampling network 43, a device for simultaneous generation of the sampling control signals $+p(t)$ and $-p(t)$ is shown in FIG. 16. It will be noted that wave forming network 46 is a device which is capable of converting the unbalanced input $+p(t)$ signal appearing within coaxial line 47 of FIG. 3 into the balanced output signals $+p(t)$ and $-p(t)$ respectively to be propagated in transmission lines 44 and 45. The wave forming network device 46 may therefore be called a time domain balun, being adapted to accomplish the above conversion without dispersion or smearing of short duration or base-band energy pulses.

Figure 6:
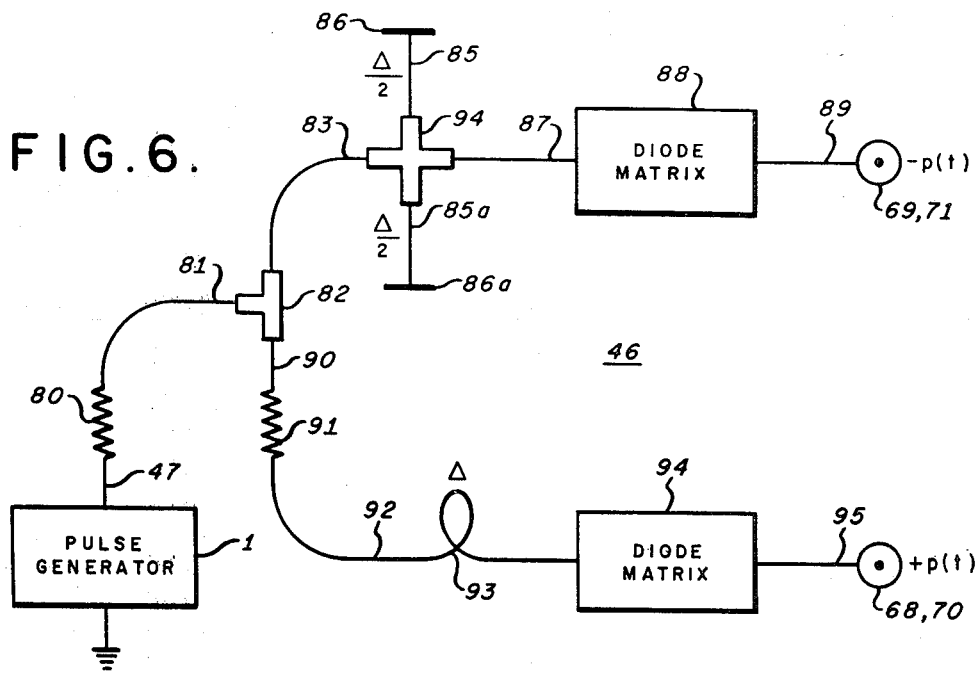
FIG. 6 is a diagram of the wave forming network of FIG. 3.

In FIG. 6, a signal propagating system is shown represented for convenience in the drawing largely as a single wire transmission line system, though it should be recognized that the single wire may be the inner conductor of a coaxial line or that it may be part of a conventional planar or other transmission line. In FIG. 6, the output line 47 of pulse generator 1 may be supplied through a level setting resistor 80 via line 81 to the input branch of a tee junction 82 having two output branches. A first output branch of tee 82 is coupled by transmission line 83 to a first signal channel for producing the signal $-p(t)$, while the second output branch of tee 82 is coupled by transmission line 90 to a second signal channel for producing the signal $+p(t)$.

Transmission line 83 couples to an input of a quadruply branched junction 84 having an output branch coupled to transmission line 87. The remaining opposite branches of junction 84 couple to respective transmission lines 85 and 85a, each shorted at its outer end, as by the respective short circuiting devices 86, 86a, and each having lengths of $\Delta/2$, where the value of $\Delta$ is yet to be explained. The output transmission line 87 is coupled to diode matrix 94, yet to be explained is connection with FIG. 7B. The output $-p(t)$ of matrix 94 may be coupled by line 89 to the coaxial line 69, 71 of FIG. 4, for example.

Transmission line 90 is coupled to a transmission line attenuator 91 and thence via transmission line 92 and delay 93 to diode matrix 88. Delay 93 has a characteristic delay time $\Delta$ related to the delay characteristics of branch lines 85 and 85a. Diode matrix 88, yet to be explained in connection with FIG. 7A provides as output $+p(t)$ on transmission line 95 that may be coupled to the coaxial transmission line 68, 70 of FIG. 4.

Figure 7A:
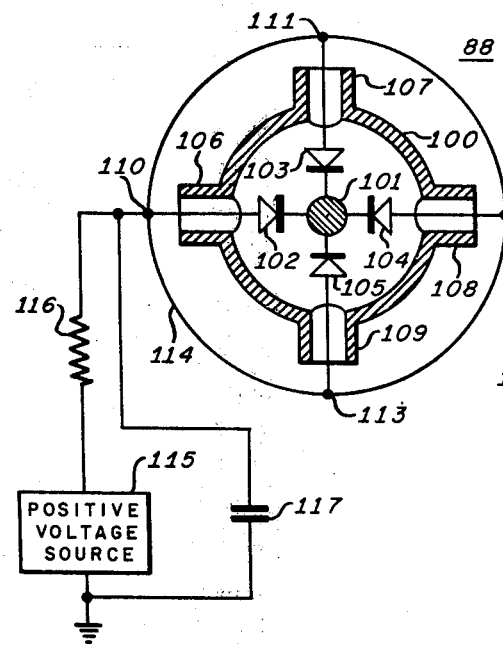
FIGS. 7A and 7B are circuit diagrams showing a cross section view of the diode matrices of FIG. 6.
Figure 7B:
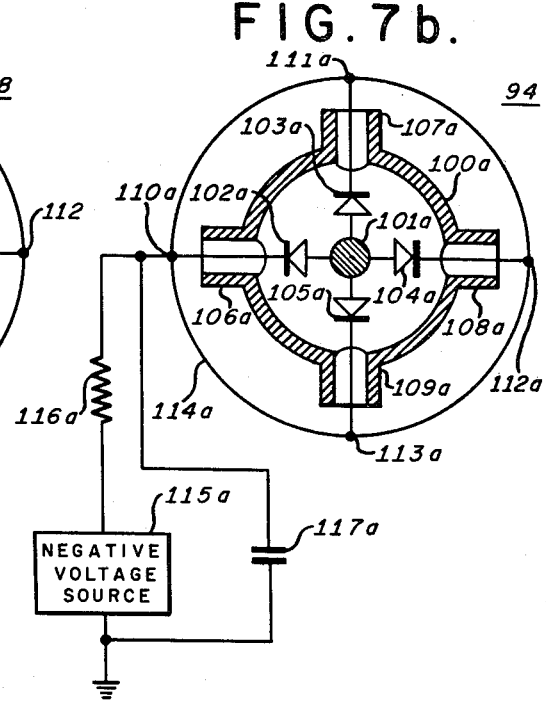

Diode matrices 88 and 94 are similar devices, and are indicated respectively in FIGS. 7A and 7B. Since matrices 88 and 94 are comprised of similar elements, reference numerals are used in FIG. 7B exactly corresponding to those used in FIG. 7A, but with the letter $a$ suffixed to them, so as to indicate such correspondence.

In FIG. 7A, diode matrix 88 comprises a section of coaxial transmission line having an outer conductor 100 and an inner conductor 101. Four substantially equally spaced apertures 106, 107, 108, 109 are provided in the wall of outer conductor 100 in a common plane. A quadruple diode network is coupled between conductor 101 and ring conductor 114 as shown in the figure. Diode 102 connects inner conductor 101 through aperture 106 to junction 110 on ring conductor 114. Diode 103 connects inner conductor 101 through aperture 107 to junction 111 on ring conductor 114. Similarly, diodes 104 and 105 respectively connect inner conductor 101 through apertures 108 and 109 to junctions 112 and 113 on ring conductor 114. Ring conductor 114 is connected to the positive terminal of voltage source 115 through level setting resistor 116. Capacitor 117 is coupled across source 115 and resistor 116.

It will be apparent upon inspection of FIG. 7B that the diode matrix 94 shown therein is similar to that of FIG. 7A with certain exceptions. For example, diodes 102a, 103a, 104a and 105a are poled oppositely to the respective diodes 102, 103, 104, and 105. Furthermore, ring conductor 114a, which supplies diodes 102a to 105a, is connected to the negative terminal of voltage source 115a through level setting resistor 116a.

Figure 8:
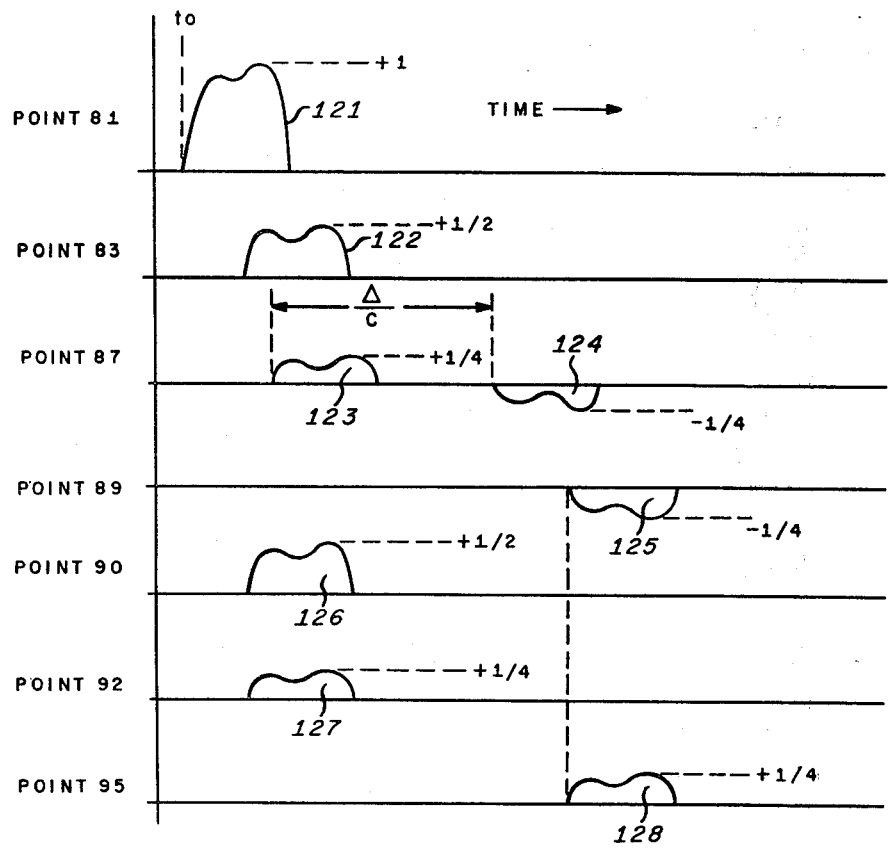
FIG. 8 is a group of wave form graphs useful in explaining the operation of the apparatus of FIGS. 6, 7A, and 7B.

In operation, the apparatus of FIGS. 6, 7A, and 7B is used in taking samples of signals flowing in the sampling network 43. An input signal of the general form of pulse 131 of FIG. 8 is fed by transmission line 81 to the input of tee 82. Pulse 121 starts at time $t_0$ and has, for example, a normalized amplitude of $+1$. If any mismatch is present at tee 82, part of the signal 121 is reflected and merely absorbed by the matched impedance of signal source 1. The signal 121 entering tee 82 is fed in two directions via transmission lines 83 and 90. The signal fed into transmission line 83 is represented at 122 in FIG. 8 as a pulse of normalized amplitude $+\frac{1}{2}$. Signal 122 is incident upon the quadruply branched junction 84 which, in essence, places a single branching stub of length $\Delta/2$ across line 83. Therefore, there is a voltage loss of one half at junction 84. The output on transmission line 87 is pulse 123 of FIG. 8, and it is fed to the diode matrix 94 as a pulse of normalized amplitude $+\frac{1}{4}$.

Since voltage source 116 supplies an appropriate voltage via ring conductor 114 to diode 102 to 105, these diodes conduct abruptly and heavily in parallel when signal 123 arrives in their common plane. The consequence is that the directly transmitted positive signal 123 is fully attenuated by the conduction of diode matrix 94. On the other hand, the negative going and later arriving signal 124, whose normalized amplitude is −¼ and which resulted from the shorted-circuit stub network 85, 85a, appears on transmission line 87 a time Δ/2 later than pulse 123, and is unaffected by diodes 102 to 105. Ultimately, it arrives on line 89 at output connection 69, 71 as a desired output signal −p(t) as represented by pulse 125 of normalized amplitude −¼ in FIG 8.

The signal flowing downward from tee 82 through transmission line 90 is represented in FIG. 8 by pulse 126 of +½ normalized amplitude. It is attenuated by resistor or attenuator pad 91 by a factor of 6dB to form pulse 127, and is then delayed by a time equivalent to twice the effective length of the stub branch 85 by delay element 93 to form pulse 128 of normalized amplitude +¼. Pulse 128 is of desired opposite polarity, equal shape, and equal timing with respect to the −p(t) pulse 125, and therefore is the desired +l(t) output pulse permitted by diode matrix 88 to appear at output 94, 70.

Matrix 88 has diodes 102a to 105a, which may be also fast-switching hot carrier diodes, and a power source 115a poled in such a manner that it has no effect upon the desired output signal 128. Moreover, diode matrix 88 provides the same kind of discontinuity to the desired positive signal +p(t) as the diodes in matrix 94 provide to the desired negative signal −p(t), since the diodes of both matrices are simply open circuits to the desired signals. Any stray signals of undesired polarity appearing at diode matrix 88 cause it to conduct, preventing such signals from reaching output 68, 70.

It is to be noted that transmission of short-duration pulses from generator 1 in FIG. 6 through the transmission line system of the figure is preferably in a transmission line medium affording energy transmission substantially solely in the TEM mode, and that propagation modes that permit dispersion or smearing of the short pulses which may, in fact, be nanosecond duration pulses, are not used. Thus, the energy of the short pulses from transmitter 1 collected by antenna 6 is effectively directed to use in the wave sampling networks 8 and 9 of FIG. 1. It should further be noted that the respective junctions 82, 84 and other elements of FIG. 6 may be made according to standard designs permitting substantially exact impedance matches over a wide frequency band. Furthermore, it will be understood that the proportions used in the drawings of FIGS. 6, 7A, and 7B are used for the purpose of providing clarity in the drawings, and do not necessarily represent proportions which would be employed in actual practice. It is seen that the apparatus of FIGS. 4 and 6 provides means for precise short-duration sampling of target echo waves wherein the sampling time and sampling duration depend only upon stable passive elements, and employs stable, balanced, non-dispersive transmission line elements for preventing distortion of the sampling and sampled signals. The apparatus is capable of operation at fast sampling rates upon short duration echo signals. This and other apparatus for the sampling of echo signals in proximity sensing or ranging apparatus are disclosed in the aforementioned U.S. patent application Ser. No. 134,991.

In the discussion of FIG. 1, it has been explained how the presence of a reflecting target causes the target presence alarm or indicator lamp 30 to operate when echo signals are received. The apparatus of FIG. 1 also permits assessment of the actual range of the reflecting object, as will now be discussed in connection with FIGS. 1 and 9.

In FIG. 1, the range era or range bin indicator 35 has a series of indicator devices 36a, 36b, 36c, 36d, . . . , 36n which may, for example, be incandescent lamps like lamp 30. Two input signals are supplied to range bin indicator 35, one being wave H of FIG. 2H coupled via transmission line 31 and pulse circuit 32, if required, to indicator 35. The second input (wave G of FIG. 2G) is applied to indicator 35 via pulse circuit 34, if required, when excited by signals corresponding to echo signals supplied to pulse circuit 34 over transmission line 33. Transmission line 33, as seen in FIG. 1, is coupled to the output of detector diode 20 also connected to one shot multivibrator 26. The material difference between waves G and H is the time delay Y, namely, the space propagation time delay corresponding to twice the target range. Pulse circuits 32 and 34 may be similar to pulse circuits 11 and 12.

Range bin indicator 35 is used to translate the time delay Y due to target range delay into a distance measurement indication. This is accomplished by feeding wave H to one port of range bin indicator 35, while feeding the synthetic echo signal generated by detector diode 20 into an opposite port of indicator 35. Since indicator 35 has a finite internal propagation characteristic for signals travelling therethrough, the oppositely flowing G and H signal wave fronts meet at a point in the propagation structure of indicator 35 determined by the value of Y. For example, the internal nature of indicator 35 is so arranged that when the oppositely flowing signals G and H cross at some location between the two input ports thereof, the time of this coincidence event will be:

$$t = \frac{2L + cY}{2c}$$

where L is the physical length of the range indicator delay structure, Y is the space propagation round trip time with respect to the reflecting obstacle, and c is the velocity of wave propagation within the indicator propagation medium. When such a coincidence occurs at an arbitrary point within indicator 35, a corresponding indicator element such as, for instance, incandescent lamp 36c is illuminated.

Figure 9:
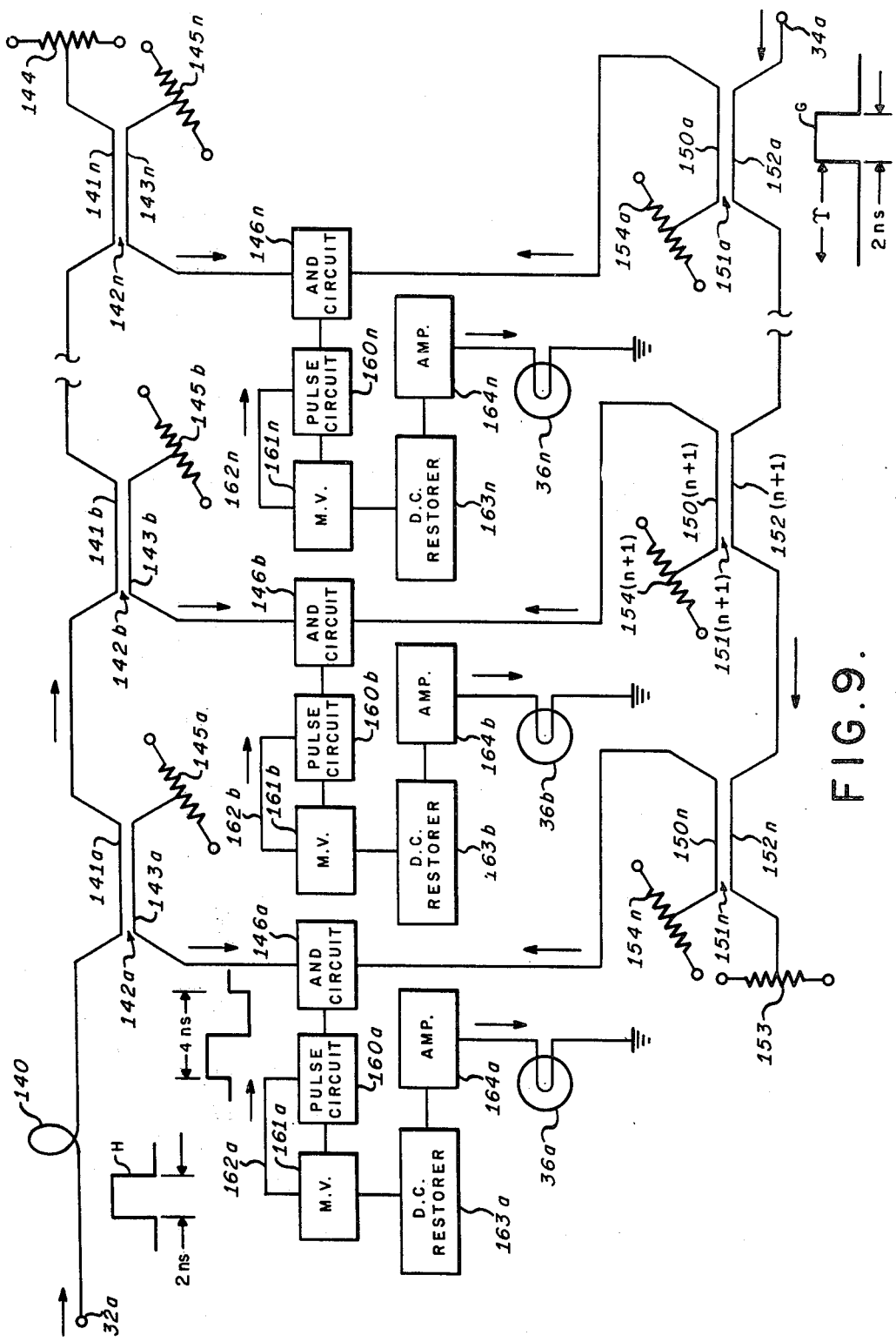
FIG. 9 is a diagram of an indicator arrangement for use with the system of FIG. 1.

Referring to FIG. 9, apparatus for performing the function of range bin indicator 35 is shown in detail. The indicator lamps 36a, 36b, . . . , 36n are identified with the same reference numerals as used in FIG. 1, as well as the two input transmission line ports 32a and 34a. The input wave H of FIG. 2H is applied via lead 32a through an arbitrary delay 140 to a series connected array of input coupling elements 141a, 141b, . . . , 141n of respective tansmission line directional couplers 142a, 142b, . . . 142n. Each coupler 142a, 142b, . . . , 142n is of a similar type and has a companion output coupling element, such as the respective output coupling elements 143a, 143b, . . . , 143n. The termination of the series of input coupling elements 141a, 141b, ..., 141n is a matched load 144. Each of the output coupling elements 143a, 143b, ..., 143n is supplied with a similar matched termination, such as the respective terminations 145a, 145b, ..., 145n. Also, each of the output coupling elements 143a, 143b, ..., 143n is supplied with a respective output transmission line for coupling out a version of wave H to a first input port of a respective coincidence or AND circuit 146a, 146b, ..., 146n.

Figure 2G:
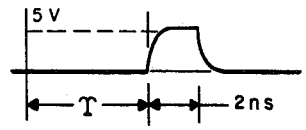
Figure 2H:
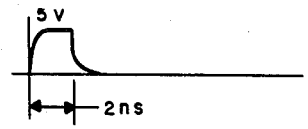
Figure 2I:
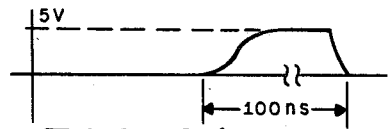
Figure 2J:
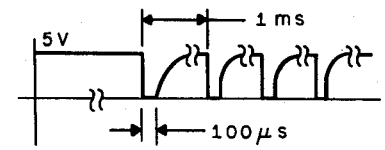

Referring now to the lower portion of FIG. 9, the synthesized echo signal G of FIG. 2G is applied via lead 34a directly to a series connected array of input coupling elements 152a, ..., *152(n−1)*, 152n of respective transmission line directional couplers 151a, ..., 151(n−1), 151n. Each such coupler 151a, ..., 151(n−1), 151n has a companion output coupling element, such as the respective output coupling elements 150a, ..., 150(n−1), 150n. The termination of the series of input coupling elements 152a, ..., 152(n−1), 152n is a matched load 153. Each of the output coupling elements 150a, ..., 150(n−1), 150n is supplied with a similar matched termination, such as the respective terminations 154a, ..., 154(n−1), 15429, Also, each of the output coupling elements 150a, ..., 150(n−1), 150n is supplied with a respective output transmission line for coupling out a version of wave G to a second input port of a respective AND circuit 146a, 146b, ..., 146n. The several AND circuits 146a, 146b, ..., 146n may be tee junctions of the type disclosed by G. F. Ross in the U.S. patent application Ser. No. 23, 147, filed Mar. 27, 1970 for an "Energy Coupler Utilizing Directional Couplers and Delay Lines to Simultaneously Trigger Plural Charging Networks into Tree for Summing at Common Output," issued Feb. 29, 1972 as patent 3,646,478 and assigned to the Sperry Rand Corporation and issued as U.S. Pat. No. 3,646,478 on Feb. 29, 1972. If desired, the AND circuits may also include active circuits of the general nature incorporated, for instance, in pulse circuits 11, 12, 32, and 34 of FIG. 1.

In the instance of the AND circuit 146a which is supplied by respective inputs from directional couplers 142a and 151n, the output of coincidence or AND circuit 146a when signals arrive at the same time at the AND gate input ports is coupled to pulse circuit 160a and is sufficient to trigger pulse circuit 160a into conduction. Such an event produces a somewhat amplified but time extended output pulse which is supplied to one shot multivibrator 161a. The output of multivibrator 161a is coupled by feed back path 162a so that its trailing edge may terminate conduction of pulse circuit 160a. It is seen that the pulse forming combination of pulse circuit 160a and multivibrator 161a may be similar to the pulse forming circuit associated with diode 20 of FIG. 1. Other known pulse forming circuits may be substituted, as previously indicated. The output of multivibrator 161a is fed to d.c. restorer 163a, a circuit having a function similar to that of the d.c. restorer circuit 26 of FIG. 1. After amplification, if required, by a suitable d.c. amplifier 164a, the d.c. restorer output signal may be coupled to a utilization device, for instance, such as the incandescent lamp 36a in FIGS. 1 and 9.

The lamp energizing circuits associated with lamps 36a, 36b, ..., 36n all have similar components similarly connected. For example, lamp 36b is actuated when signals from directional couplers 142 b and 152(n−1) arrive simultaneously at the input ports of coincidence or AND circuit 146b aided by pulse circuit 160b, one shot multivibrator 161b, feed back connection 162b, d.c. restorer 163b, and d.c. amplifier 164b. In a similar manner, lamp 36n is activated when signals from directional couplers 142n and 151a arrive simultaneously at the input ports of coincidence or AND circuit 146n, aided by pulse circuit 160n, one shot multivibrator 161n, feed back circuit 162n, d.c. restorer 163n, and d.c. amplifier 146n. As a reflecting target approaches receiver antenna 6, lamp 36n is first illuminated. If the target continues to approach, lamp 36b eventually lights. Finally, when the target has reached the very shortest range era, lamp 36a is excited, previously illuminated lamps having been successively extinguished. For a reflecting target moving away from the system, lamp 36a is first illuminated; it goes out when lamp 36b is illuminated and so on until lamp 36n is illuminated and then finally extinguished when the reflecting target passes out of the operating range of the system.

It will be understood that the transmission lines which feed signals to the respective coincidence or AND circuits 146a, 146b, ..., 146n are selected for their ability to propagate base-band signals with substantially no distortion. While dual parallel transmission lines or other lines such as coaxial transmission lines are preferably employed, any selected transmission line should be substantially devoid of impedance discontinuities and should be so constructed as to support only TEM mode propagation of high frequency or base-band energy, since it is the TEM transmission line mode that is the substantially dispersion free mode of propagation.

It is seen that the object detector receiver of FIG. 1 is a wide band or wide open detector device, a receiver which will respond to any signal level in excess of the bias level which might be dictated by the characteristics of a particular tunnel diode detector 20. The amplitude of the received base-band pulse at the receiving antenna 6 may be, for example, about 200 millivolts in a typical operating circumstance, a value several orders of magnitude greater than the signals present in an urban environment due to conventional radiation sources, such interfering signals normally being at a microvolt level. Accordingly, although the object detecting receiver of FIG. 1 essentially accepts all signals over a very wide pass band, it is substantially immune to interference from conventional radiation sources.

The directive transmitter-antenna configuration 1, 2 shows in FIG. 1 may, for instance, transmit a regular train or burst of extremely short duration, relatively low amplitude base-band pulses. In one typical situation, these impulse-like signals have time durations of substantially 200 picoseconds and a pulse repetition frequency of the order of 10 kilohertz. However, the upper bound on the average power transmitted into space may be less than one microwatt. The spectrum of the transmitted base-band signal is spread over an extremely wide band, typically 100 megahertz to 10 gigahertz. Accordingly, the power radiated in any typical narrow communication band is far below the thermal noise threshold of a typical conventional communication receiver operating in that band. The transmitted base-band pulse is therefore incapable of interfering with the operation of standard radio communication equipment, while being remarkably adapted for use with the novel object detection apparatus of the present invention.

While the invention has been described in its preferrred embodiments, it is to be understood that the words which have been used are words of description rather than of limitation and that changes within the purview of the appended claims may be made without departing from the true scope and spirit of the invention in its broader aspects.

I claim:

1. Gain control apparatus for control of the amplitude of and for selecting base-band signals propagating is non-dispersive transmission line means between input means and utilization means responsive to selected ones of said base-band signals, said non-dispersive transmission line means including first and second parallel-connected non-dispersive transmission lines, said gain control apparatus comprising:

first and second wave-sampling means respectfully disposed in series relation within said respective first and second parallel-connected non-dispersive transmission lines, attenuator means disposed within said first parallel-connected transmission line in series with said first wave sampling means, and wave sampler pulsing means for activating said first and second wave sampling means in first and second discrete time intervals for propagation of selected attenuated base-band signals to said utilization means during said first time interval and of selected directly propagated base-band signals to said utilization means during said second time interval.

2. Apparatus as described in claim 1 wherein:

said first and second wave sampling means comprise plural diode means disposed in parallel relation within each of said respective first and second parallel connected nondispersive transmission lines, and said wave sampler pulsing means controls the conductivity of said plural diode means for passage of said selected base-band signals therethrough.

3. Apparatus as described in claim 2 wherein said utilization means comprises diode circuit means directly responsive to said selected base-band signals for producing substantially unipolar output signals of greater amplitude and duration than said selected base-band signals.

* * * * *